United States Patent Office 3,574,735
Patented Apr. 13, 1971

3,574,735
PROCESS FOR THE MANUFACTURE OF UNSATURATED PHOSPHONIC ACID DICHLORIDES
Kurt Sennewald, Knapsack, near Cologne, Alexander Ohorodnik, Liblar, Dieter Kirstein, Cologne-Lindenthal, and Hans-Joachim Hardel, Bruhl-Vochem, Germany, assignors to Knapsack Aktiengesellschaft, Knapsack, near Cologne, Germany
No Drawing. Filed Dec. 6, 1967, Ser. No. 688,342
Claims priority, application Germany, Dec. 23, 1966, K 61,005
Int. Cl. C07f 9/42
U.S. Cl. 260—543　　　　　　　　　　　　　　7 Claims

ABSTRACT OF THE DISCLOSURE

Production of unsaturated phosphonic acid dichlorides from halogeno-alkane phosphonic acid dichlorides containing a halogeno-alkane radical with 2 to 8 carbon atoms by thermal dehydrohalogenation and continuous distillative removal of resulting unsaturated phosphonic acid dichloride from reaction mixture, wherein the thermal dehydrohalogenation is carried out in the presence of triphenyl-phosphine as the catalyst.

---

It is known that unsaturated phosphonic acid dichlorides can be prepared by reaction of a suitable unsaturated phosphonic acid or phosphonic acid ester with phosphorus pentachloride or thionyl chloride. However, the use of these processes on a commercial scale is considerably impaired by the fact that the acid chlorides are required to be employed in fairly large excess proportions. In the event that phosphorus pentachloride is used, the reaction is found also to produce an equivalent proportion of phosphorus oxychloride as a byproduct, which is difficult to separate from unsaturated phosphonic acid dichlorides.

A process for the production of unsaturated phosphonic acid dichlorides has been reported in Swiss Pat. 391,699, wherein halogeno-alkane phosphonic acid dichlorides are subjected to dehydrohalogenation, at temperatures between 60 and 300° C., preferably between 100 and 270° C. The dehydrohalogenation is advantageously achieved at a temperature, which firstly enables the hydrogen halide to be split off at a sufficient velocity and to a fairly large extent, and which secondly enables any remarkable thermal decomposition of desirable reaction product to be still obviated. For example, vinyl phosphonic acid dichloride is produced from β-chloroethane phosphonic acid dichloride at a temperature between 190 and 300° C., the reaction proceeding at a velocity which is the higher the higher the reaction temperature selected.

This process, when carried out on a commercial scale using relatively large amounts of halogeno-alkane phosphonic acid dichlorides, does not permit obviating the formation of increasing proportions of byproducts, which are formed as a result of the relatively high dehydrohalogenation temperatures and of the necessary long reaction periods, and which considerably impair the yield in desirable unsaturated phosphonic acid dichloride. To reduce the rate of byproduct formation and to obtain optimum yields in unsaturated phosphonic acid dichloride, it appears necessary to modify conventional reaction conditions with respect to purity of starting material, reaction period and reaction temperature, it being highly desirable to reduce the reaction temperature and to shorten the reaction period.

In accordance with a preferred mode of executing the process of Swiss Pat. 391,699, the halogeno-alkane phosphonic acid dichlorides are dehydrohalogenated at temperatures between 0 and 80° C. in the presence of a tertiary amine, which is used in a proportion equivalent to that in which the halogeno-alkane phosphonic acid dichloride is use. The amine assumes the function of a hydrogen halide acceptor, which means that the use of large amounts of halogeno-alkane phosphonic acid dichloride results in the formation of corresponding amounts of amine salt. After separation from the reaction mixture, it is necessary to transform the amine salt so as to obtain the free amine for further use thereof in the dehydrohalogenation. In view of the expense entailed by amine recovery, the above process must be termed to be a complicated and uneconomic procedure.

It has now been found that halogeno-alkane phosphonic acid dichlorides are accessible to dehydrohalogenation yielding unsaturated phosphonic acid dichlorides at relatively low dehydrohalogenation temperatures, yet at high reaction velocity which enables the formation of byproducts to be obviated, given that the dehydrohalogenation is accelerated by means of a suitable catalyst.

The present process for the production of unsaturated phosphonic acid dichlorides from halogeno-alkane phosphonic acid dichlorides having a straight chain or branched halogeno-alkane radical with 2 to 8 carbon atoms by thermal dehydrohalogenation and continuous distillative removal of resulting unsaturated phosphonic acid dichloride from reaction mixture, the dehydrohalogenation being achieved within a temperature range between the boiling point of the unsaturated phosphonic acid dichloride and a value below the boiling point of the halogeno-alkane phosphonic acid dichloride, comprises more especially carrying out the dehydrohalogenation in the presence of triphenyl phosphine as a catalyst.

The starting materials for use in carrying out the present process are comprised more particulary of chloro- or bromo-alkane phosphonic acid dichlorides. In accordance with a preferred feature of the present process, the starting material is used in admixture with triphenyl phosphine, the triphenyl phosphine being employed in a concentration of about 0.01 to about 0.5% by weight, advantageously about 0.1% by weight. For example, vinyl phosphonic acid dichloride can be produced by subjecting β-chloroethane phosphonic acid dichloride containing 0.1% by weight triphenyl phosphine to dehydrochlorination, at a temperature of about 200° C.

The dehydrohalogenation of halogeno-alkane phosphonic acid dichlorides by the present process can be achieved batchwise or continuously, when relatively large quantities of unsaturated phosphonic acid dichlorides are produced. In order substantially to prevent side reactions from occurring in the reaction mixture, it is advantageous to use dehydrohalogenation temperatures high enough to ensure a fairly low content of unsaturated phosphonic acid dichloride in the liquid phase, as a result of the equilibrium existing between liquid phase and vapor phase. If in some given case it should prove necessary to dehydrohalogenate the halogeno-alkane phosphonic acid dichloride at a low temperature, e.g., at a temperature lower than 200° C., which means lower reaction velocity, it is possible to increase the catalyst concentration for compension of such lower reaction velocity. Speaking generally, the dehydrohalogenation temperature to be selected is a function of the boiling point of the halogeno-alkane phosphonic acid dichloride to undergo dehydrohalogenation, which boiling point is higher than that of the unsaturated phosphonic acid dichloride desired to be produced.

The unsaturated phosphonic acid dichlorides obtainable in good yields by the process of the present invention are valuable intermediates for use in quite a number of synthesis. By hydrolysis with water, an aqueous alkali or acid, they can be transformed in conventional manner into corresponding phosphonic acids, and by esterification with an alcohol or glycol, they can be transformed into the corresponding esters. The unsaturated phosphonic acid dichlorides and the above derivatives thereof are polymerization-active compounds for homopolymerization and copolymerization with further monomers. The polymers so made can be used in the varnish and plastics fields and have also acquired considerable interest as adhesives.

As compared with conventional non-catalytic methods, the process of the present invention offers the advantage of producing a four to five times better space/time yield. The use of triphenyl phosphine as the catalyst could not be expected to produce such advantage because this compound as a reactive substance would have been expected to undergo reaction with the compounds contained in the reaction mixture and thus lose its catalytic activity. This undesirable effect has not been observed in practice, and the catalyst proportions suggested to be used in accordance with the present invention have been found to enable the transformation of large amounts of halogeno-alkane phosphonic acid dichlorides into corresponding unsaturated phosphonic acid dichlorides.

The following examples illustrate the present process:

EXAMPLE 1

(Conventional process)

2200 grams β-chloroethane phosphonic acid dichloride having a purity of 85%, were gradually heated to a temperature of 220° C. and gaseous mixture, which was formed of vinyl phosphonic acid dichloride and hydrogen chloride and which passed over at a temperature between 150 and 170° C., was withdrawn continuously. The dehydrochlorination was found to be complete after 30 hours. The gaseous mixture was cooled and 870 grams vinyl phosphonic acid dichloride were liquefied; this corresponded to a yield of 60% of the theoretical.

EXAMPLE 2

(Conventional process)

2200 grams β-chloroethane phosphonic acid dichloride having a purity of 85% were mixed with 2.2 grams triphenyl phosphine, and the resulting mixture was gradually heated to a temperature of 200 to 205° C. A gaseous mixture, formed of vinyl phosphonic acid dichloride and hydrogen chloride, passed over at a temperature between 150 and 170° C., which was cooled to separate the vinyl phosphonic acid dichloride. The dehydrochlorination was found to be complete after 8 hours. There were obtained 1200 grams pure vinyl phosphonic acid dichloride, corresponding to a yield of 82% of the theoretical.

EXAMPLE 3

(Conventional process)

1000 grams β-chloroethane phosphonic acid dichloride having a purity of 90% were gradually heated to a temperature of 210 to 235° C. and gas mixture, passing over at a temperature between 150 and 170° C., was continuously withdrawn. The dehydrochlorination was found to be complete after 15 hours. The gaseous mixture was cooled and 560 grams vinyl phosphonic acid dichloride were liquefied; this corresponded to a yield of 78% of the theoretical.

EXAMPLE 4

(Process of invention)

1000 grams starting material the same as that used in Example 3 were mixed with 1.1 grams triphenyl phosphine and the resulting mixture was gradually heated to a temperature of 190 to 205° C. The dehydrochlorination reaction, which occurred at that temperature, was found to be complete after 3½ hours. The gas mixture, which passed over, was condensed and 830 grams vinyl phosphonic acid dichloride were separated, corresponding to a yield of 95% of the theoretical.

EXAMPLE 5

(Process of invention, continuous)

A 500 cc. round flask, provided with packed column, dropping funnel and oil bath, was charged with 100 grams β-chloroethane phosphonic acid dichloride having a purity of 98% and with 0.1 gram triphenyl phosphine. The mixture in the flask was heated then to a temperature of 190 to 200° C. and fresh β-chloroethane phosphonic acid dichloride was introduced dropwise into the flask at the same rate as reaction product, formed earlier and comprised of hydrogen chloride and vinyl phosphonic acid dichloride, passed over. A total of 1500 grams β-chloroethane phosphonic acid dichloride was reacted within 5 hours. The catalytic activity of the triphenyl phosphine could not be found to have been reduced.

The distillate was comprised of 1110 grams pure vinyl phosphonic acid dichloride, corresponding to a yield of 94% of the theoretical.

We claim:
1. In the process for the manufacture of unsaturated phosphonic acid dichlorides from halogeno-alkane phosphonic acid dichlorides having a halogeno-alkane radical with 2 to 8 carbon atoms, by thermal dehydrohalogenation and continuous distillative removal of resulting unsaturated phosphonic acid dichlorides from reaction mixture, the dehydrohalogenation being achieved within a temperature range between the boiling point of the unsaturated phosphonic acid dichloride and a value below the boiling point of the halogeno-alkane phosphonic acid dichloride, the improvement which comprises carrying out the thermal dehydrohalogenation in the presence of triphenyl phosphine as a catalyst.

2. The process of claim 1, wherein the halogeno-alkane phosphonic acid dichloride used as starting material is comprised of a member selected from the group consisting of chloro- or bromo-alkane phosphonic acid dichlorides.

3. The process of claim 1, wherein the starting material is used in admixture with about 0.01 to about 0.5% by weight triphenyl phosphine.

4. The process of claim 3, wherein the triphenyl phosphine is used in a concentration of about 0.1% by weight.

5. The process of claim 1, wherein β-chloroethane phosphonic acid dichloride is dehydrochlorinated in the presence of 0.1% by weight triphenyl phosphine, at a temperature of about 200° C.

6. The process of claim 1, wherein the halogeno-alkane phosphonic acid dichlorides have a straight chain halogeno-alkane radical.

7. The process of claim 1, wherein the halogen-alkane phosphonic acid dichlorides have a branched halogeno-alkane radical.

References Cited

FOREIGN PATENTS 1,245,360  7/1967  Germany.

LORRAINE A. WEINBERGER, Primary Examiner

E. J. GLEIMAN, Assistant Examiner